(12) United States Patent
Chang et al.

(10) Patent No.: US 7,313,079 B2
(45) Date of Patent: Dec. 25, 2007

(54) METHOD AND APPARATUS FOR HEADER DETECTION AND PROTECTION

(75) Inventors: Kuang-Jung Chang, Taipei (TW); Shun-Yung Wang, Hsin-Chu Hsien (TW)

(73) Assignee: Mediatek Incorporation, Hsin-Chu, Hsien (TW)

( * ) Notice: Subject to any disclaimer, the term of this patent is extended or adjusted under 35 U.S.C. 154(b) by 568 days.

(21) Appl. No.: 10/904,031

(22) Filed: Oct. 20, 2004

(65) Prior Publication Data

US 2005/0117501 A1 Jun. 2, 2005

(30) Foreign Application Priority Data

Dec. 1, 2003 (TW) .............................. 92133753 A (51) Int. Cl.
*G11B 7/00* (2006.01)
(52) U.S. Cl. ................. 369/124.12; 369/44.42
(58) Field of Classification Search ............. 369/275.3, 369/47.1, 47.27, 44.41, 124.12, 44.42, 124.07
See application file for complete search history.

(56) References Cited

U.S. PATENT DOCUMENTS

| | | | |
|---|---|---|---|
| 6,400,658 B1 * | 6/2002 | Yang et al. ............... | 369/30.25 |
| 6,469,979 B1 * | 10/2002 | Joo et al. ................. | 369/275.3 |
| 6,614,740 B1 | 9/2003 | Park et al. | |

* cited by examiner

*Primary Examiner*—Nabil Hindi
(74) *Attorney, Agent, or Firm*—Winston Hsu (57) ABSTRACT

A method of using an RF-sum signal and a plurality of detection signals to determine a property of at least one header and selecting one of a plurality of carrier regions is disclosed. The RF-sum signal and the plurality of detection signals are produced according to the header. The method includes using the RF-sum signal to produce a protection range signal, which indicates the position of the header. The protection region signal is used to protect the plurality of detection signals and determine the property of the header and the correct carrier region.

28 Claims, 11 Drawing Sheets

METHOD AND APPARATUS FOR HEADER DETECTION AND PROTECTION

BACKGROUND

The invention relates to a method of header detection and protection, and more particularly, to in an optical storage system using a protection range signal corresponding to the header to correctly determine a property of the header.

Although typical optical discs, such as compact discs (CDs) according to the related art, conveniently provide user data storage, the storage capacity is limited. More and more, this limited storage capacity is becoming insufficient and unable to meet users' needs. Because of this, the storage industry has developed some new optical disc standards having increased storage capacity when compared with the original compact disc. One example is the digital versatile disc (DVD) standard. The DVD standard includes several specifications including DVD-R, DVD-RAM, DVD-RW, etc. However, all the DVD standards have several characteristics in common, such as specifying the same physical size as typical CDs, yet have substantially increased storage capacity. When an optical storage system accesses a CD or a DVD, an optical pick-up is used to read data stored on the optical disc or to perform data writing operations to store data onto the optical disc. Furthermore, when accessing the optical disc, the pick-up head must be positioned at a target track before the read or write operation can take place. When the pick-up head is performing track seek operations or tracking operations, the optical disc position, speed, and direction are important parameters that must be controlled.

Figure 1:
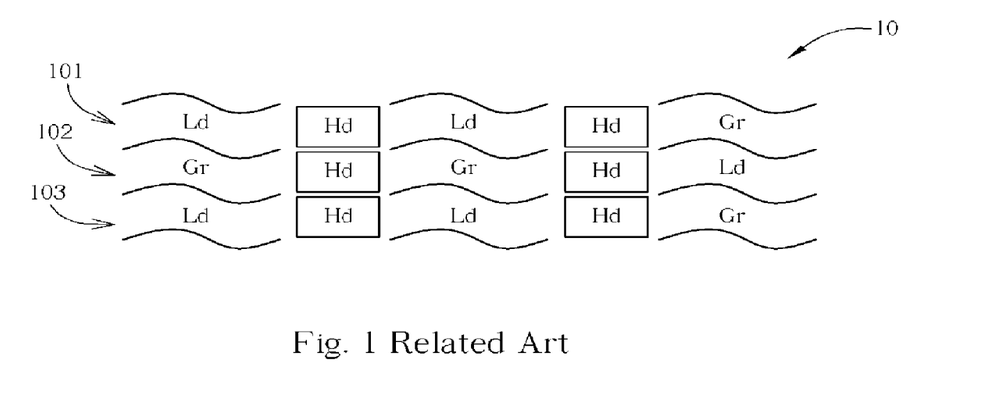
FIG. 1 is a diagram of a section of a data track on a typical DVD-RAM optical disc according to the related art.

Similar to CDs, information recorded on DVDs is stored in a plurality of data tracks. Using the DVD-RAM specification as an example, data tracks are formed using a single spiral track structure. Please refer to FIG. 1. FIG. 1 shows a section of a data track 10 on a typical DVD-RAM optical disc and includes a first data track 101, a second data track 102, and a third data track 103. Data tracks on a DVD-RAM optical disc comprise two different types of carrier regions being aligned around the DVD optical disc: groove tracks Gr and land tracks Ld. Unlike CDs, information recorded on DVD-RAM optical discs is not simply recorded using the groove tracks Gr, but is also recorded using the land tracks Ld positioned between the groove tracks Gr to store information. Because data is at the same time stored to both the groove tracks Gr and the land tracks Ld, and because the gap distance between the two carrier regions is maintained, when compared to typical CDs, in which the data follows along and uses only the groove tracks Gr, the data density in a DVD disc is increased by a factor of two. As shown in FIG. 1, stored data is recorded in sectors in both the groove tracks Gr and the land tracks Ld in each data track 10. DVD-RAM optical discs allocate a Complementary Allocated Pit Address (CAPA) at the start of each sector, which is stored in a header Hd. Therefore, one header Hd is stored between the groove track Gr and the land track Ld for each loop of the spiraled track structure of the data track 10.

Figure 2:
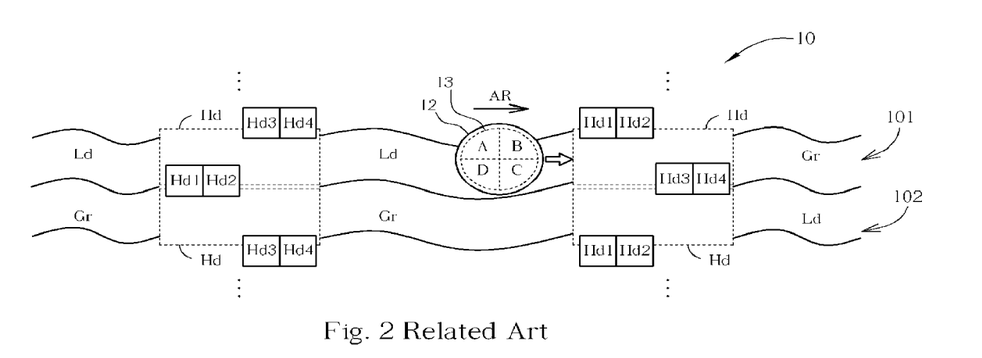
FIG. 2 is diagram showing the relative positions of two data tracks from FIG. 1 and an optical detector.
Figure 3:
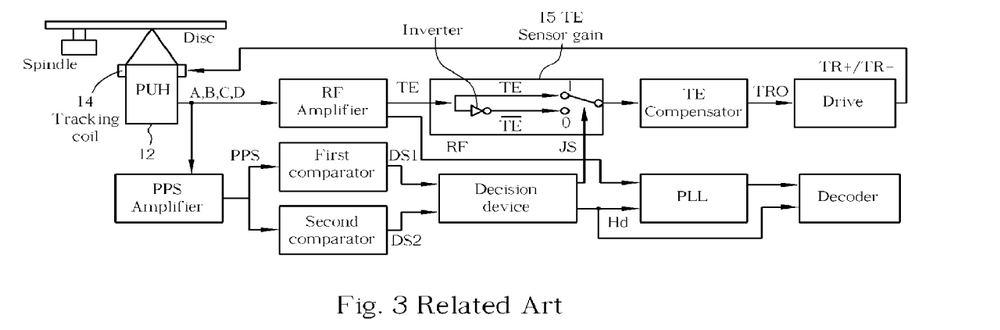
FIG. 3 is a function diagram of an tracking control system in DVD-RAM disc according to the related art.

In an optical storage system, in order for the optical pick-up to read data stored on an optical disc such as a DVD-RAM optical disc, the optical pick-up emits a laser beam to form a focused light point on the optical disc. Reflected light is then received from the DVD-RAM optical disc by the optical pick-up. Please refer to FIG. 2. FIG. 2 shows the relative positions of two data tracks (the first data track 101 and the second data track 102) from FIG. 1 and an optical detector 13 of an optical pick-up 12. The arrow AR in FIG. 2 indicates the track direction of the DVD-RAM optical disc. The detector 13 of the pick-up 12 follows this track direction AR on the first data track 101 and the second data track 102 to form a read data signal for the DVD-RAM optical disc. The optical detector 13 is divided into four quadrant sensors: a first sensor A, a second sensor B, a third sensor C, and a fourth sensor D. The optical detector 13 receives a light beam reflected by pits on the optical disc and, according to the amount of reflected light that lands on each quadrant of the optical detector 13, produces a corresponding electrical signal. As mentioned above, because data stored on a DVD-RAM is stored in both the groove tracks Gr and the land tracks Ld, each data track 10 simultaneously includes both a groove track Gr and a land track Ld. However, when the optical pick-up is reading data, a decision must be made of whether to focus the light beam on the groove track Gr or the land track Ld, and a decision must be made to determine each switch-over point. Additionally, a typical optical storage system includes an object lens, which is used to focus the laser beam emitted by the optical pick-up 12 on the DVD-RAM optical disc. As shown in FIG. 3, when the optical pick-up 12 is performing tracking operations on the groove track Gr and the land track Ld, the polarity of a controlling signal (TRO) changes by 180 degrees. The controlling signal (TRO) changes the polarity according to the tracking error (TE) sensor gain 15, which changes the polarity of tracking error (TE) by the decision signal JS of groove/land track. Additionally, the controlling signal (TRO) is used to control a coil motor 14 that adjusts the object lens. As such, accurately deciding whether to follow the groove track Gr or the land track Ld is very important in order to accurately control the optical pickup 12 and the object lens adjustment operation. Because each loop of the spiral structure of the data track 10 only contains a single switch-over point, which represents a switch over from the groove track Gr to the land track Ld or from the land track Ld to the groove track Gr, the polarity of the coil motor 14 control signal (TRO) needs to change one time when the optical pick-up 12 accesses data during each turn of the DVD-RAM optical disc. Otherwise, the object lens will lock on the wrong track and cause data read errors.

Figure 4:
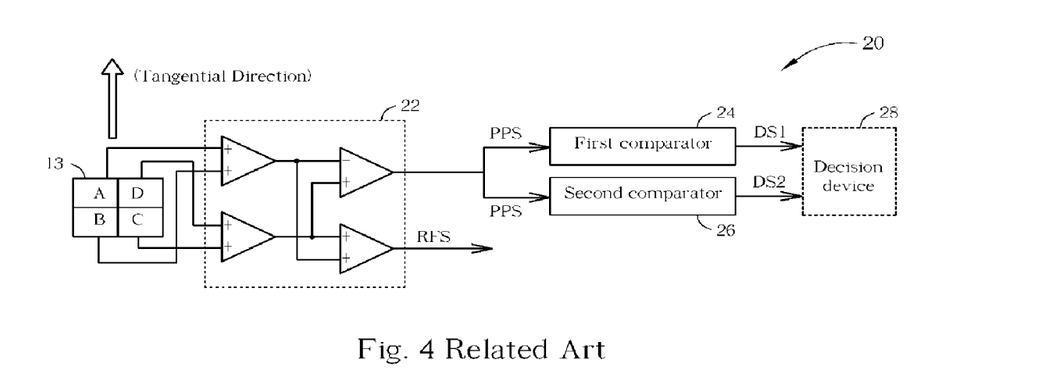
FIG. 4 is a functional block diagram of an optical storage system according to the related art.

As shown in FIG. 2, the header is divided into four sub-headers: a first sub-header Hd1, a second sub-header Hd2, a third sub-header Hd3, and a fourth sub-header Hd4. The first to the fourth sub-headers (Hd1-Hd4) of the header Hd are located according to a set alignment sequence for each track. Positioned at the switch-over point between the different carrier regions, ½ of the sub-headers are located to the left of a center line between the groove track Gr and the land track Ld, and ½ of the sub-headers are located to the right of the center line. This property of the first to the fourth sub-headers (Hd1-Hd4) not only indicates the physical position of the header Hd, but also allows the optical storage system determine whether to follow the groove track Gr or the land track Ld. The most direct method for determining which carrier region (track type) to follow involves using the relative positions of the four sub-headers at the switch-over point. Because the sub-headers have different positions, the four quadrant sensors of the optical detector 13 generate different detection signals. This header Hd property allows a decision to be made of whether the next sector uses the groove track Gr or the land track Ld. Please refer to FIG. 4. FIG. 4 shows a functional block diagram of an optical storage system 20 according to the related art. The optical storage system 20 includes the optical detector 13 of FIG. 2, an optical pickup module 22, a first comparator 24, a second comparator 26, and a decision device 28. When the optical pick-up 12 passes a header Hd, as shown in FIG. 2, the optical pickup module 22 uses the optical signals received by the four quadrant sensors (A, B, C, D) of the optical detector 13 to produce a push-pull signal PPS and an RF-sum signal RFS. In this implementation, the four quadrant sensors (A, B, C, D) of the optical detector 13 each produce a corresponding output signal (a, b, c, d). The value of the push-pull signal PPS is [(a+b)−(c+d)], and the value of the RF-sum signal is (a+b+c+d). Next, the first comparator 24 and the second comparator 26 use the push-pull signal PPS to generate a first detection signal DS1 and a second detection signal DS2. More specifically, the first comparator 24 compares the push-pull signal PPS to a positive comparator voltage to determine the high voltage pulses of the push-pull signal PPS that exceed the positive comparator voltage and thereby generates the first detection signal DS1. Using a similar method, the second comparator 26 compares the push-pull signal PPS to a negative comparison voltage and determines the low voltage pulses from the push-pull signal PPS that are lower than the negative comparator voltage and thereby generates the second detection signal DS2. Finally, according to the first detection signal DS1 and the second detection signal DS2, the decision device 28 decides the header type.

An example using both FIG. 2 and FIG. 4 is described as follows. When the optical pick-up 12 follows the land track Ld in the direction shown for the first data track 101 in FIG. 2 and the track type after the header Hd remains the land track Ld, the C quadrant sensor and the D quadrant sensor of the optical detector 13 first detect the first sub-header Hd1 and the second sub-header Hd2. The A quadrant sensor and the B quadrant sensor of the optical detector 13 then detect the third sub-header Hd3 and the fourth sub-header Hd4. The signals (c+d), corresponding to the first and second sub-headers Hd1, Hd2, lead the signals (a+b), which correspond to the third and fourth sub-headers Hd3, Hd4. Please note that when switching from the land track Ld to the groove track Gr, the A quadrant sensor and the B quadrant sensor of the optical detector 13 first detect the first sub-header Hd1 and the second sub-header Hd2. The C quadrant sensor and the B quadrant sensor of the optical detector 13 then detect the third sub-header Hd3 and the fourth sub-header Hd4. Because of this, in the ideal situation, the signals (a+b), corresponding to the first and the second sub-headers Hd1, Hd2, lead the signals (c+d), which correspond to the third and the fourth sub-headers Hd3, Hd4.

Figure 5:
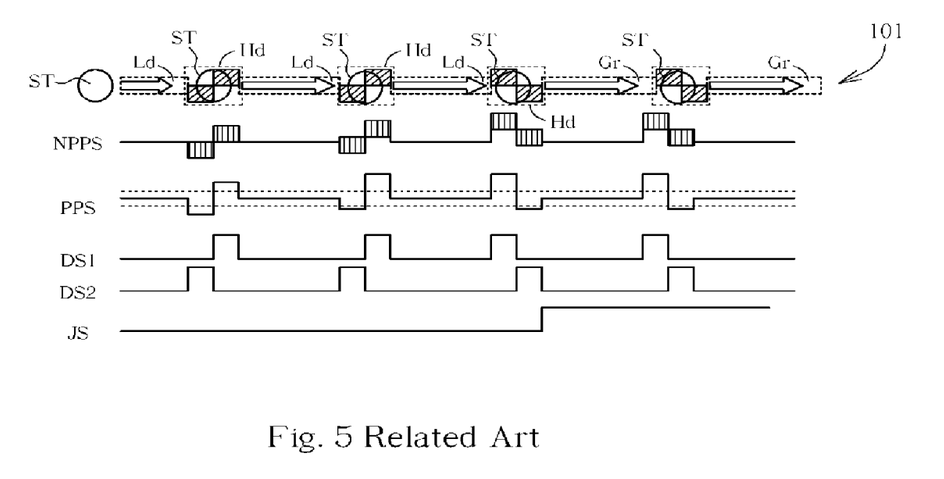
FIG. 5 is a timeline diagram of the signals of FIG. 4 in an ideal operating environment.

Please refer to FIG. 5. FIG. 5 shows a timeline diagram of the signals of FIG. 4 in the ideal operating environment and includes the push-pull signal (including a non-filtered push-pull signal NPPS and a filtered push-pull signal PPS), the first detection signal DS1, and the second detection signal DS2. FIG. 5 shows the signal changes as a focused light point ST moves along the first data track 101. As previously mentioned, according to the related art, the first comparator 24 and the second comparator 26 use the predefined positive and negative comparator voltages (shown in FIG. 5 as the dotted lines through the push pull signal PPS) to generate the first and the second detection signals DS1, DS2 having different phase/time relationships. The first detection signal DS1 corresponds to the signals (a+b) produced according to first and the second sub-headers Hd1, Hd2. The second detection signal DS2 corresponds to the signals (c+d) produced according to the third and the fourth sub-headers Hd3, Hd4. In this implementation example, when the optical pick-up 12 is following along a land track Ld, the second detection signal DS2 leads the first detection signal DS1. However, when the optical pick-up 12 needs to switch from a land track Ld to a groove track Gr, the first detection signal DS1 leads the second detection signal DS2. In this way, the change of the lead/lag relationship between the first detection signal DS1 and the second detection signal DS2 indicates that the system must switch between the land track Ld and the groove track Gr. The decision device 28 shown in FIG. 4 toggles the value of an output decision signal JS and the polarity of the controlling signal for the object lens coil motor. Using the same logic, if the optical pick-up 12 in FIG. 2 is following the groove track Gr of the second data track 102, the optical system 20 shown in FIG. 4 produces corresponding signals allowing an adjustment from the groove track Gr to the land track Ld. In other words, carrier region selection is performed in the same way.

However, in reality, the focused light point ST produced by the optical pickup 12 often does not accurately follow the data track (the first data track 101) but instead sometimes deviates from the track center. This induces a track slippage phenomenon during track seek operations and also causes instability when following a groove track Gr or a land track Ld. Due to these problems, errors appear in the decision signal JS and the polarity of the object lens coil motor polarity, and the object lens locks on the incorrect track.

Figure 6:
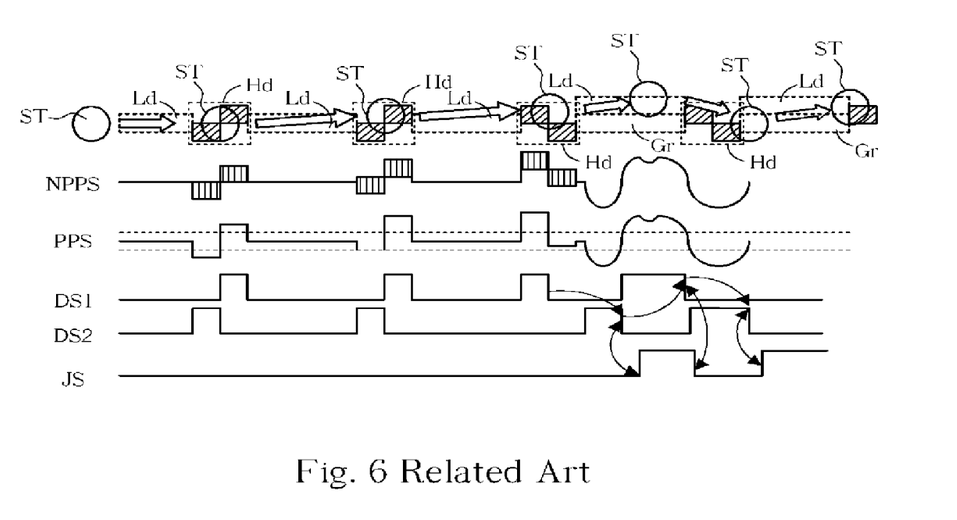
FIG. 6 is a timeline diagram of the signals of FIG. 5 in a more realistic operating environment.

Please refer to FIG. 6. FIG. 6 shows a timeline diagram of the signals of FIG. 4 and FIG. 5 in a more realistic operating environment and includes the push-pull signal (including the non-filtered push-pull signal NPPS and the filtered push pull signal PPS), the first detection signal DS1, the second detection signal DS2, and the decision signal JS. As shown in FIG. 6, the focused light point ST does not accurately follow the first data track 101. Because when passing the switch-over point from the land track Ld to the groove track Gr the focused light point ST has already deviated from the original data track 10 (for example because of the track slippage phenomenon), the header Hd detection is flawed and the push-pull signal PPS is unstable. As such, the original predefined (positive and negative) comparator voltages do not cause the first comparator 24 and the second comparator 26 to generate correct first and second detection signals DS1, DS2. This causes an incorrect value on the decision signal JS and results in an incorrect polarity change on the coil motor control signal and instability of the system as a whole.

SUMMARY

One objective of the claimed invention is therefore to provide a method and apparatus for use in an optical storage system for using an RF-sum signal to produce a protection range signal to accurately determine a property of a header, to solve the above-mentioned problem.

According to the claimed invention, a protection range generator receives an RF-sum signal and produces a protection range signal used to accurately protect the header. Additionally, the present invention apparatus uses a DC offset produced when a focused light point passes each header to produce a square wave protection signal. The portion of a first detection signal and a second detection signal falling within the protection range is used to determine the property of the header and determine an accurate switch-over point between a land track and a groove track, improving the stability and track seeking efficiency of the optical storage system.

Also according to the claimed invention, a method is disclosed for using an RF-sum signal and a plurality of detection signals to determine a property of at least one header. The RF-sum signal and the plurality of detection signals are produced according to the header. The method comprises using the RF-sum signal to produce a protection range signal, wherein the protection range signal indicates the position of the header; and using the protection signal to protect the plurality of detection signals and determine the property of the header.

Also according to the claimed invention, a method is disclosed for using an RF-sum signal, a first detection signal, and a second detection signal to select one of a plurality of carrier regions. The method comprises using the RF-sum signal to produce a protection range signal, wherein the protection range signal indicates the position of the header; and using the protection range signal to protect the first detection signal and the second detection signal in order to select one of the plurality of carrier regions.

Also according to the claimed invention, a method used in an optical storage system is disclosed for selecting one of a plurality of optical storage carrier regions on an optical storage medium. The plurality of carrier regions includes at least a first carrier region and a second carrier region, and the optical storage medium includes a plurality of headers. The method comprises the following steps: (a) according to at least one header on the optical storage medium, producing a corresponding push-pull signal and an RF-sum signal; (b) after step (a), according to the push-pull signal, producing a first detection signal and a second detection signal; (c) after step (b), mathematically processing the RF-sum signal to produce a center value; (d) after step (c), comparing the center value and the RF-sum signal to produce a corresponding protection range signal; (e) after step (d), performing a logic operation on the first detection signal and the second detection signal with the protection range signal to produce a first protected detection signal and a second protected detection signal, respectively; and (f) after step (e), using the first protected detection signal and the second protected detection signal to select the first carrier region or the second carrier region.

Also according to the claimed invention, a device used in an optical storage system is disclosed for protecting at least one header property. The device comprises a protection range generator for receiving an RF-sum signal and producing a protection range signal; and a logic module electrically coupled to the protection range generator for receiving a first detection signal, a second detection signal, and the protection range signal for producing a first protected detection signal and a second protected detection signal. Wherein the RF-sum signal, the first detection signal, and the second detection signal are produced according to the header.

These and other objectives of the claimed invention will no doubt become obvious to those of ordinary skill in the art after reading the following detailed description of the preferred embodiment that is illustrated in the various figures and drawings.

DETAILED DESCRIPTION

Figure 7:
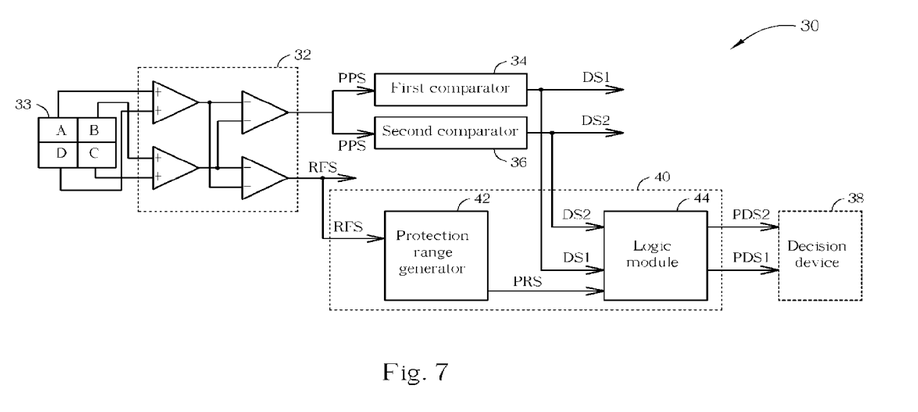
FIG. 7 is a functional block diagram of a protection device according to a first embodiment of the present invention.

The method and apparatus disclosed according to the present invention is based on the optical track structure shown in FIG. 1 and FIG. 2, and on the optical storage system described in FIG. 4. Furthermore, the examples used throughout the description of the present invention continue to relate to the DVD-RAM specification. The present invention provides high speed and accurate recognition of the switch-over points between land tracks Ld and groove tracks Gr of a DVD-RAM disc, and improves the track locking stability and overall efficiency of the optical storage system. Please refer to FIG. 7. FIG. 7 shows a functional block diagram of a protection device 40 according to a first embodiment of the present invention. The protection device 40 is installed in an optical storage system 30 and is used to protect the property of at least one header Hd and select the next carrier region (land track Ld or groove track Gr). FIG. 7 shows the structure of the optical storage system 30 and includes an optical detector 33, an optical pick-up module 32, a first comparator 34, and a second comparator 36. Inheriting the technical characteristics of the typical optical storage system, the four quadrant sensors A, B, C, D of the optical detector 33 produce corresponding output signals a, b, c, d. As previously mentioned, when the focused light point ST passes the header Hd of a DVD-RAM disc shown in FIG. 2, the optical pick-up module 32 uses the output signals of the four quadrant sensors A, B, C, D of the optical detector 33 to produce a push-pull signal PPS and an RF-sum signal RFS. The value of the push-pull signal PPS is [(a+b)−(c+d)], and the value of the RF-sum signal RFS is (a+b+c+d). The first comparator 34 and the second comparator 36 use the push-pull signal PPS to generate a first detection signal DS1 and a second detection signal DS2, which are then used to determine the property of the header Hd.

Using the above mentioned RF-sum signal RFS, the first detection signal DS1, and the second detection signal DS2 produced by the typical optical system 30, the protection device 40, according to the present invention, provides an accurate header Hd detection function. The protection device 40 according to the embodiment shown in FIG. 7 includes a protection range generator 42 and a logic module 44. The protection range generator 42 receives the RF-sum signal RFS, and according to the RF-sum signal RFS, produces a protection range signal PRS. The logic module 44 is electrically coupled to the protection generator 42 and receives the protection range signal PRS. A logic operation is performed on the protection range signal PRS with the first detection signal DS1 and the second detection signal DS2 to produce a first protected detection signal PDS1 and a second protected detection signal PDS2, respectively. Please note, the signal read by the optical storage system from the optical storage tracks is referred to as an RF signal. The RF-sum signal RFS is formed by the output signals (a, b, c, d) of the four quadrant sensors of the optical detector 33 summed together after the focused light point ST has already passed the four sub-headers Hd1-Hd4 of the header Hd. In other words, when the focused light point ST passes the header Hd, time domain changes of the correspondingly produced RF-sum signal RFS adequately provide information indicating the position of the header Hd on the DVD-RAM disc. Because of this, a technical characteristic of the present invention is using this property of the RF-sum signal RFS to detect an accurate position of each header Hd. Accordingly, an important objective of the protection range generator 42 of this embodiment of the present invention is to process and account for noise that may be present in the original RF-sum signal RFS. The processed RF-sum signal RFS (the protection range signal PRS) represents the positive DC offset of the RF signal when the focused light point ST passes the header Hd. The falling and rising square-wave pattern of the protection range signal PRS becomes the protection range signal, which accurately detects when the focuses light point ST passes by the header Hd position.

Because of this, when the focused light point ST passes each header Hd, the protection range signal produced from the RF-sum signal RFS accurately represents the header Hd position. The logic module 44 receives this protection range signal and generates correct detection signals, which are comprised of the portions of the first detection signal DS1 and the second detection signal DS2 which fall within the protection range. The asserted portions of the first detection signal DS1 and/or the second detection signal DS2 not falling within the protection range are ignored. In other words, the logic operations performed by the logic module 44 involve logically ANDing the first detection signal DS1 and the second detection signal DS2 with the protection range signal to form the first protected detection signal PDS1 and the second protected detection signal PDS2, respectively. In this way, the first protected detection signal PDS1 and the second protected detection signal PDS2 are able to correctly act as header detection signals and indicate the corresponding header Hd positions. As such, only when the lead/lag relationship between the first protected detection signal PDS1 and the second protected detection signal PDS2 changes should a switch-over between the land track Ld and the groove track Gr be performed.

Figure 8:
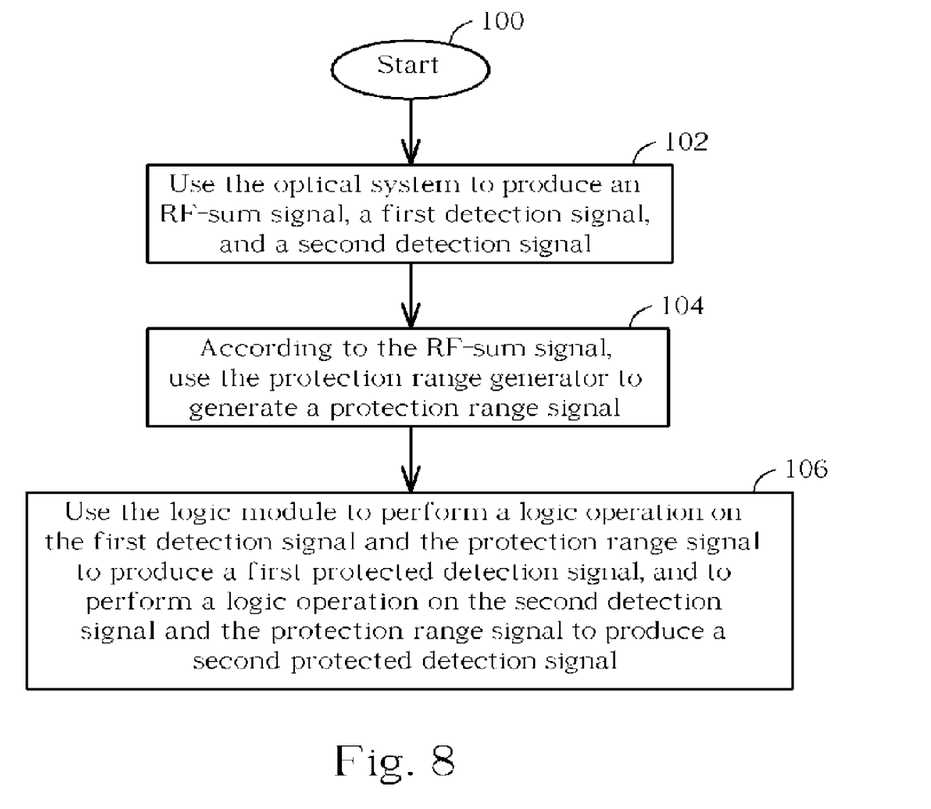
FIG. 8 is a flowchart describing a simplified method of header Hd detection according to the present invention.

Based on the structure of the above stated protection device 40 shown in FIG. 7, the present invention uses the RF-sum signal RFS, the first detection signal DS1, and the second detection signal DS2 to determine the header Hd property and determine the correct carrier region (either land track Ld or groove track Gr). Please refer to FIG. 8. FIG. 8 shows a flowchart describing a simplified method of header Hd detection according to the present invention and includes the following steps:

Step 100: Start.

Step 102: When the focused light point ST passes a header Hd, use the optical pick-up module 32 of the optical storage system 30 to produce a corresponding push-pull signal PPS and an RF-sum signal RFS. Use the original predefined (positive and negative) comparator voltages to generate the first detection signal DS1 and the second detection signal DS2. In one implementation, the push-pull signal PPS and the positive comparator voltage are connected to the first comparator 34. Voltage levels in the push-pull signal PPS above the positive comparator voltage are extracted to form the first detection signal DS1. Likewise, the push-pull signal PPS and the negative comparator voltage are connected to the second comparator 36. Voltage levels in the push-pull signal PPS below the negative comparator voltage are extracted to form the second detection signal DS2. Proceed to step 104.

Step 104: Use the protection range generator 42 to generate a protection range signal PRS according to the RF-sum signal RFS. The protection range signal PRS includes a corresponding protection range, and this protection range indicates the correct position of the header Hd. Proceed to step 106.

Step 106: Use the logic module 44 to receive the protection range signal PRS, the first detection signal DS1, and the second detection signal DS2. Perform a logic operation on the first detection signal DS1 and the protection range signal PRS to produce a first protected detection signal PDS1. Also, perform a logic operation on the second detection signal DS2 and the protection range signal PRS to produce a second protected detection signal PDS2. Namely, the present invention uses the protection range generator 42 to produce a protection range signal PRS, and indicates the portions of the first detection signal DS1 and the second detection signal DS2 that fall within the protection range of the protection range signal PRS while ignoring the portions of the first detection signal DS1 and the second detection signal DS2 that do not fall within the protection range of the protection signal PRS.

Figure 9:
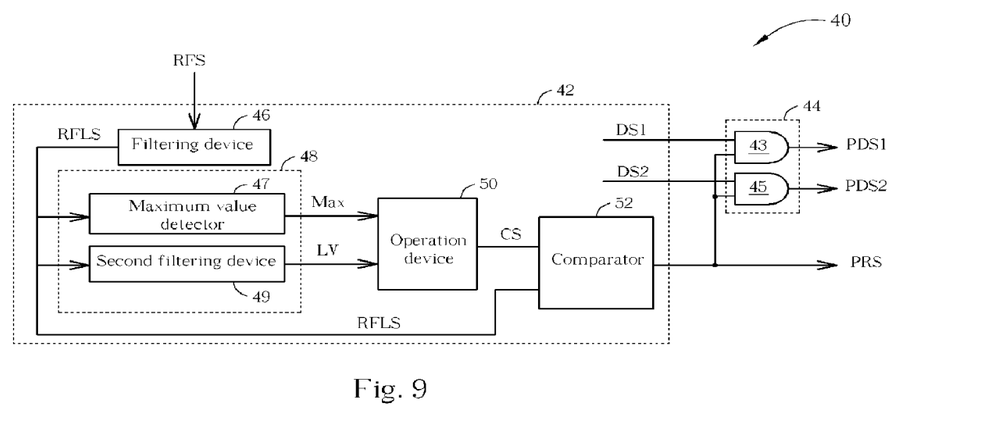
FIG. 9 is a more detailed functional block diagram of the protection device of FIG. 7.

When producing the first protection signal PDS1 and the second protection signal PDS2 in step 106, similar to the related art, the optical storage system 30 further includes a decision device 38. According to the phase/time relationship between the first protected detection signal PDS1 and the second protected detection signal PDS2, the decision device 38 determines the header Hd property and the next carrier region (either land track Ld or groove track Gr). In an actual implementation, the filtering of the original noisy RF-sum signal RFS to produce a protection range signal PRS that can accurately indicate the position of the header Hd is very important. Please refer to FIG. 9. FIG. 9 is a more detailed functional block diagram of the protection device 40 of FIG. 7. The protection device 40 of FIG. 9 is based on the structure of FIG. 7 and includes a protection range generator 42 and a logic module 44. The protection range generator 42 includes a filtering device 46, a value extractor 48, an operation device 50, and a comparator 52. The filtering device 46 filters the RF-sum signal RFS to produce an RF-level signal RFLS. The value extractor 48 is electrically coupled to the filtering device 46 to extract a maximum value Max and a low value LV from the RF-level signal RFLS. The operation device 50 is electrically coupled to the value extractor 48 to calculate the average value between the maximum value Max and the low value LV, and this average value is output as a center value CS. Next, the comparator 52 is electrically coupled to the operation device 50 and the filtering device 46 in order to use the center value CS as a positive voltage potential. The center value CS and the RF-level signal RFLS are compared to form the protection range signal PRS.

In order to obtain the maximum value Max and the low value LV of the RF-level signal RFLS, the value extractor 48 includes a maximum value detector 47 and a second filtering device 49. The RF-level signal RFLS is approximately a square wave signal. The maximum value detector 47 is for detecting the high voltage level of the square wave (the maximum voltage level). Generally speaking, because the space occupied by every header Hd in a DVD-RAM disc is very small, in the time domain for the RF-level signal RFLS, the high pulses of the square wave are separated by a very long time duration. Therefore, the second filtering device 49 is for filtering away the higher frequency signal component of the RF-level signal RFLS square wave signal to obtain the low value LV (the average value). In this way, even if the RF-level signal RFLS is affected by noise, the low value LV obtained by the second filtering device 49 will not be under or over the correct average value.

In an actual implementation, the center value CS generated by the operation device 50 is not limited to being the average value of the maximum value Max and the low value LV. Any mathematical combination of the maximum value Max and the low value LV of the RF-level signal RFLS can be used as long as the center value CS is able to provide a proper positive voltage potential. Additionally, in order to comply with the present invention, when the center value CS and the RF-level signal RFLS are compared, the produced protection range signal PRS must correctly correspond to the position of the header Hd. Continuing the description, the logic module 44 includes a first AND gate 43 and a second AND gate 45. The first AND gate 43 is used to perform a logical AND operation of the first detection signal DS1 and the protection range signal PRS to thereby produce the first protected detection signal PDS1. The second AND gate 45 is used to perform a logical AND operation of the second detection signal DS2 and the protection range signal PRS to thereby produce the second protected detection signal PDS2. In this way, the first protected detection signal PDS1 and the second protected detection signal PDS2 are not asserted during periods when the protection range signal PRS is not at a logic high. Furthermore, changes in the lead/lag relationship of the first protected detection signal PDS1 and the second protected detection signal PDS2 now correctly represent switch-over points between the land track Ld and the groove track Gr.

Figure 10:
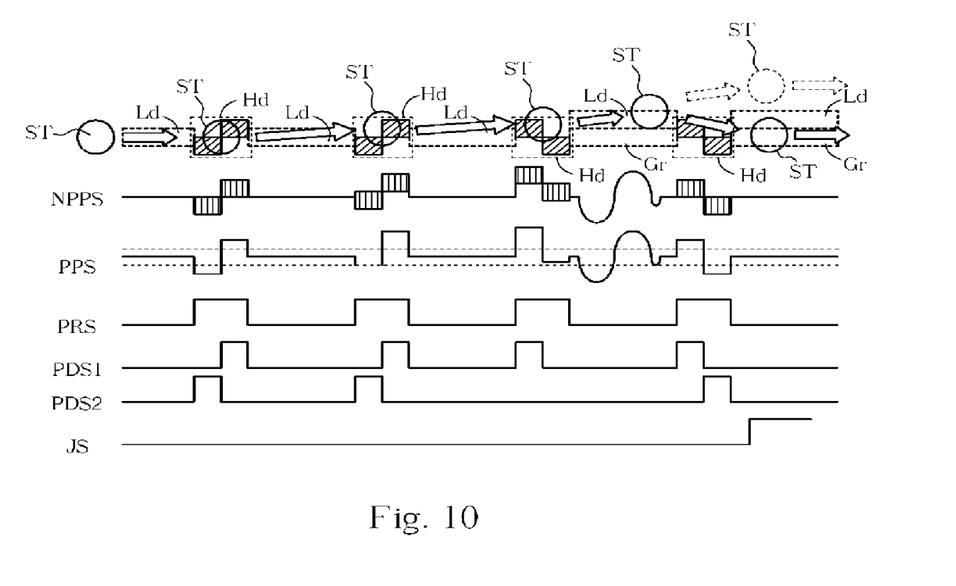
FIG. 10 is a timeline diagram of the signals of FIG. 9 in a realistic operating environment.

Please refer to FIG. 10. FIG. 10 shows a timeline diagram of the push pull signal PPS, the first protected detection signal PDS1, the second protected detection signal PDS2, and a decision signal JS of FIG. 9 in a realistic operating environment. In a realistic operating environment, the focused light point ST does not accurately follow the first data track 10. When the optical pickup 12 is following the land track, the second detection signal DS2 leads the first detection signal DS1. When the optical pickup 12 changes from the land track Ld to the groove track Gr, because the focused light point ST at the header Hd position has deviated from the original data track 10 (for example, due to track slippage), header Hd detection is not correct. This produces an unstable push-pull signal PPS. However, because the protection range signal PRS has filtered out the detection signals not within the protection region, the lead/lag relationship of the first protected detection signal PDS1 and the second protected detection signal PDS2 still correctly represents the carrier region switch-over points. As shown in FIG. 10, when the first protected detection signal PDS1 switches to lead the second protected detection signal PDS2, this indicates the focused light point ST should switch to the groove track Gr. In this situation, the decision device 38 toggles the value of the output decisions signal JS and switches polarity of tracking error (TE) sensor gain 15 and inverts the control signal (TRO) for the object lens coil motor 14 of the optical system. In this way, when the focused light point ST produced by the optical pickup 12 incorrectly deviates from the data track or when the optical pickup 12 suffers from the track slippage phenomenon, the polarity of the object lens coil motor 14 control signal (TRO) is not erroneously toggled and the system remains properly locked on the groove track Gr or land track Ld.

Figure 11:
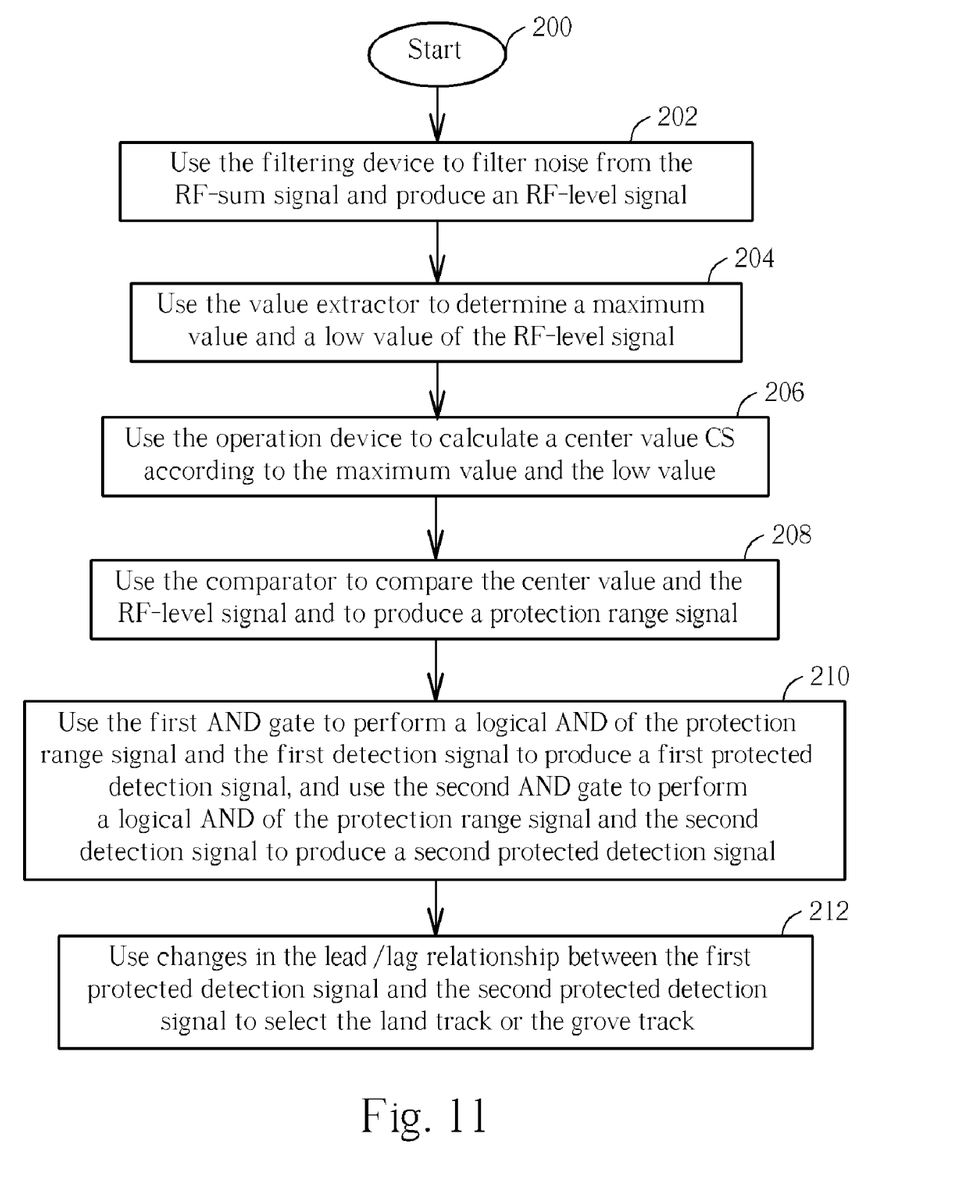
FIG. 11 is a more detailed flowchart showing a method of header detection according to the present invention.

Based on the structure of the protection device 40 described above, FIG. 11 is a flowchart describing a method for using the first protected detection signal PDS1 and the second protected detection signal PDS2 to determine the switch-over point between the land track Ld and the groove track Gr according to the present invention. FIG. 11 is a more detailed flowchart showing a method of header detection according to the present invention and includes the following steps:

Step 200: Start.

Step 202: When the focused light point ST passes the header Hd, provide an RF-sum signal RFS, a first detection signal DS1, and a second detection signal DS2 using the optical storage system 30. Use the filtering device 46 to filter the noise from the RF-sum signal RFS and produce an RF-level signal RFLS. Proceed to step 204.

Step 204: Use the value extractor 48 to determine the maximum value Max and the low value LV of the RF-level signal RFLS. The extractor 48 includes a maximum value detector 47 and a second filtering device 49. The maximum value detector 47 is for detection the maximum value of the RF-level signal RFLS, and the second filtering device 49 is for passing the higher frequency component of the RF-level signal RFLS and removing the square wave portion. Proceed to step 206.

Step 206: Use the operation device 50 to receive the maximum value Max and the low value LV output by the value detector 48, and calculate the average of the two values to generate a center value CS. Proceed to step 208.

Step 208: Use the comparator 52 to compare the center value CS and the RF-level signal RFLS, and produce a protection range signal PRS. Proceed to step 210.

Step 210: Connect the protection range signal PRS and the first detection signal DS1 to the first AND gate 43 in the logic module 44, and connect the protection range signal PRS and the second detection signal DS2 to the second AND gate 45. Use the first AND gate 43 to perform a logical AND of the protection range signal PRS and the first detection signal DS1 to produce a first protected detection signal PDS1. Use the second AND gate 45 to perform a logical AND of the protection range signal PRS and the second detection signal DS2 to produce a second protected detection signal PDS2. Proceed to step 212.

Step 212: Use the change in the lead/lag relationship (phase/time difference) between the first protected detection signal PDS1 and the second protected detection signal PDS2 to determine the land track Ld or the groove track Gr selection. When the focused light point ST switches from the land track Ld to the groove track Gr or switches from the groove track Gr to the land track Ld, the lead/lag relationship between the first protected detection signal PDS1 and the second protected detection signal PDS2 changes. Because of this change, the decision device 38 toggles the value of the decision signal JS and toggles the polarity of the control signal (TRO) for the object lens coil motor 14.

Because each data track loop of a DVD-RAM disc has a switch-over point, for each turn of the DVD-RAM, the polarity of the control signal (TRO) for the object lens coil motor 14 needs to change one time. Otherwise, the object lens will lock on the incorrect data track carrier region and cause data read errors and system instability. The present invention uses a first protected detection signal and a second protected detection signal to indicate the correct position of the header Hd and determine the switch-over point between the land track Ld and the groove track Gr. This eliminates the instability problem of the related art and increases the efficiency and stability of track seek operations.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for using an RF-sum signal and a plurality of detection signals to determine a property of at least one header, the RF-sum signal and the plurality of detection signals being produced according to the header, the method comprising:

using the RF-sum signal to produce a protection range signal, wherein the protection range signal indicates the position of the header;

performing a logic operation on each detection signal with the protection range signal to produce a plurality of corresponding protected detection signals; and using the plurality of protected detection signals to determine the property of the header.

2. The method of claim 1, wherein the step of using the RF-sum signal to produce a protection range signal comprises:

using the RF-sum signal to produce a center value; and comparing the center value and the RF-sum signal to produce the protection range signal;

and the step of performing the logic operation on each detection signal with the protection range signal comprises logically ANDing each detection signal with the protection range signal to produce the plurality of corresponding protected detection signals.

3. The method of claim 1, wherein the header is recorded on an optical storage medium.

4. The method of claim 3, wherein the optical storage medium is a DVD-RAM optical disc.

5. A method of using an RF-sum signal, a first detection signal, and a second detection signal to select one of a plurality of carrier regions, the method comprising:

using the RF-sum signal to produce a protection range signal, wherein the protection range signal indicates the position of the header;

performing a logic operation on the first and the second detection signals with the protection range signal to produce a first protected detection signal and a second protected detection signal, respectively; and using the first protected detection signal and the second protected detection signal to select one of the plurality of carrier regions.

6. The method of claim 5, wherein the step of performing the logic operation on the first and the second detection signals with the protection range signal comprises:

logically ANDing the protection range signal with the first detection signal and the second detection signal to produce the first protected detection signal and the second protected detection signal, respectively.

7. The method of claim 5, further comprising:

using the RF-sum signal to produce a center value; and
comparing the center value and the RF-sum signal to produce the protection range signal.

8. The method of claim 7, further comprising:

filtering the RF-sum signal to produce an RF-level signal;
extracting a maximum value and a low value from the RF-level signal; and
averaging the maximum value and the low value to produce the center value.

9. The method of claim 8, wherein the low value is generated by filtering the RF-level signal.

10. The method of claim 5, wherein the first protected detection signal and the second protected detection signal have a phase/time difference, the method further comprising:

using the phase/time difference between the first protected detection signal and the second protected detection signal to select one of the plurality of carrier regions.

11. The method of claim 10, wherein the plurality of carrier regions are recorded on an optical storage medium, the plurality of carrier regions comprising a first carrier region and a second carrier region, the method further comprising:

when the first protected detection signal leads the second protected detection signal, selecting the first carrier region; and when the first protected detection signal lags the second protected detection signal, selecting the second carrier region.

12. The method of claim 11, wherein the optical storage medium comprises a DVD-RAM optical disc, the first carrier region comprises a groove track Gr, and the second carrier region comprises a land track Ld.

13. The method of claim 12, wherein the optical storage medium comprises at least one header, and each header comprises a plurality of sub-headers; the RF-sum signal corresponding to a DC offset produced by the plurality of sub-headers; and the first detection signal and the second detection signal being extracted from a push-pull signal, the push pull signal being produced according to the plurality of sub-headers.

14. A method used in an optical storage system for selecting one of a plurality optical storage carrier regions on an optical storage medium, the plurality of carrier regions including at least a first carrier region and a second carrier region, the optical storage medium including a plurality of headers, the method comprising the following steps:

(a) according to at least one header on the optical storage medium, producing a corresponding push-pull signal and an RF-sum signal;

(b) after step (a), according to the push-pull signal, producing a first detection signal and a second detection signal;

(c) after step (b), mathematically processing the RF-sum signal to produce a center value;

(d) after step (c), comparing the center value and the RF-sum signal to produce a corresponding protection range signal;

(e) after step (d), performing a logic operation on the protection range signal with the first detection signal and the second detection signal to produce a first protected detection signal and a second protected detection signal, respectively; and (f) after step (e), using the first protected detection signal and the second protected detection signal to select the first carrier region or the second carrier region.

15. The method of claim 14, further comprising:

(g) during step (c), filtering the RF-sum signal to produce an RF-level signal;

(h) after step (g), extracting a maximum value and a low value from the RF-level signal; and (i) after step (h), averaging the maximum value and the low value to produce the center value.

16. The method of claim 15, wherein the optical storage system comprises a filtering device, a value extractor, and an operation device; wherein step (g) is performed using the filtering device, step (h) is performed using the value extractor, and step (i) is performed using the operation device.

17. The method of claim 16, wherein the value extractor comprises a maximum value detector and a second filtering device, the maximum value detector being used to extract the maximum value of the RF-level signal, and the second filtering device being used to produce the low value.

18. The method of claim 14, wherein the optical storage system comprises a comparator and at least one logic AND gate, step (d) is performed using the comparator, and, in step (e), the logic operation is performed using the logic AND gate.

19. The method of claim 14, wherein the first protected detection signal and the second protected detection signal have a phase/time difference, the method further comprising:
(j) during step (f), using the phase/time difference between the first protected detection signal and the second protected detection signal to select the first carrier region or the second carrier region.

20. The method of claim 19, wherein at least one header is positioned between the first carrier region and the second carrier region, the method further comprising:
(k) using the phase/time difference between the first protected detection signal and the second protected detection signal, which both correspond to the header, to determine whether to switch from the first carrier region to the second carrier region or to switch from the second carrier region to the first carrier region.

21. The method of claim 14, wherein the optical storage medium comprises a DVD-RAM optical disc, the first carrier region comprises a groove track, and the second carrier region comprises a land track.

22. A device used in an optical storage system for protecting at least one header property, the device comprising:
a protection range generator for receiving an RF-sum signal and producing a protection range signal; and
a logic module electrically coupled to the protection range generator for receiving a first detection signal, a second detection signal, and the protection range signal for producing a first protected detection signal and a second protected detection signal;
wherein the RF-sum signal, the first detection signal, and the second detection signal are produced according to the header.

23. The device of claim 22, wherein the protection range generator comprises:
a filtering device for filtering the RF-sum signal to produce an RF-level signal;
a value extractor electrically coupled to the filtering device for extracting a maximum value and a low value from the RF-level signal;
an operation device electrically coupled to the value extractor for performing an operation on the maximum value and the low value to produce a center value; and
a comparator electrically coupled to the operation device and the filtering device for comparing the center value and the RF-level signal to produce the protection range signal.

24. The device of claim 23, wherein the value extractor comprises:
a maximum value detector for detecting the maximum value of the RF-level signal; and
a second filtering device for extracting a low value of the RF-level signal.

25. The device of claim 22, wherein the logic module comprises:
a first AND-gate for logically ANDing the first detection signal and the protection range signal to produce a first protected detection signal; and
a second AND-gate for logically ANDing the second detection signal and the protection range signal to produce a second protected detection signal.

26. The device of claim 22, further comprising a decision device for using the first protected detection signal and the second protected detection signal to determine the property of the header.

27. The device of claim 22, wherein the at least one header is recorded on an optical storage medium, the optical storage medium having a first carrier region and a second carrier region, and the header property comprising information concerning whether to use the first carrier region or the second carrier region.

28. The device of claim 27, wherein the optical storage medium comprises a DVD-RAM optical disc, the first carrier region comprises a groove track, and the second carrier region comprises a land track.

* * * * *